(No Model.)
J. R. ASHLEY.
WIRE BALE TIE.
No. 285,947.  Patented Oct. 2, 1883.
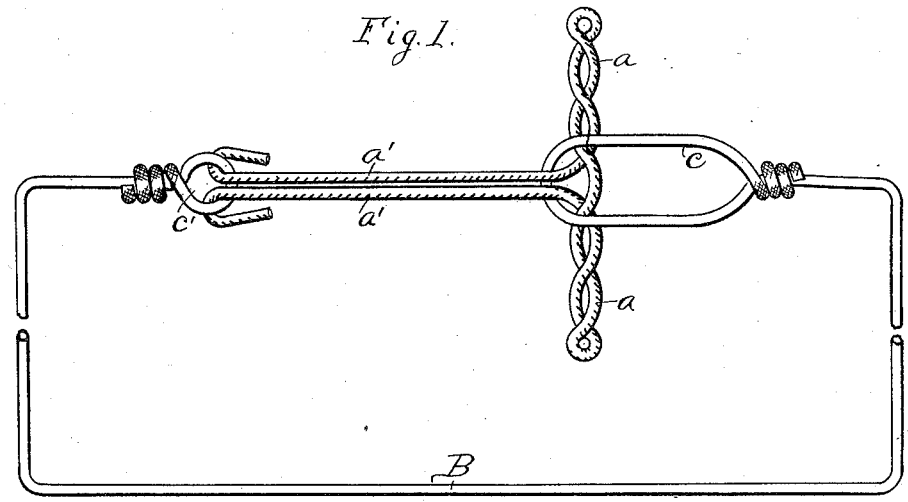
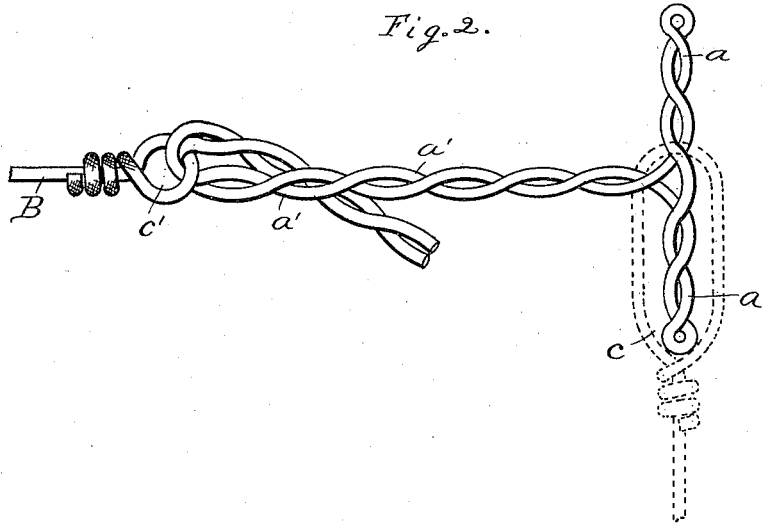
Witnesses.
Thos. F. Hutchins.
Wm. J. Hutchins
Inventor
James R. Ashley.

UNITED STATES PATENT OFFICE.

JAMES R. ASHLEY, OF JOLIET, ILLINOIS.

WIRE BALE-TIE.

SPECIFICATION forming part of Letters Patent No. 285,947, dated October 2, 1883.

Application filed August 11, 1883. (No model.)

*To all whom it may concern:*

Be it known that I, JAMES R. ASHLEY, a citizen of the United States of America, residing at Joliet, in the county of Will and State of Ilinois, have invented certain new and useful Improvements in Wire Bale-Ties, of which the following is a specification, reference being had therein to the accompanying drawings.

Figure 1 is a perspective view of a finished bale-tie; Fig. 2, a perspective view of the short part or splice, showing the mode of its connection with the bale-tie proper.

This invention relates to certain improvements in wire bale-ties for baling up hay or other fibrous material, which particular improvements are set forth in the following specification and claim.

Referring to the drawings, B represents the bale-tie proper, having the loops c and c', one formed on each end. These bale-wires B are intended to be manufactured so they are all of one length when finished, so it will not be necessary to make them of different lengths to fit different-sized bales. The tie B is made to fit any bale by means of a separate piece of wire, a', one end of which is hooked into the loop c', as shown in either of the figures, and drawn up until it makes the finished bale-tie of the proper length for the bale. The other end of the splice or piece a' is formed in the shape shown, and terminates in the oppositely-extending twisted arms a a, which are intended to be passed downward through the loop c of the tie B and lie flat on the bale between it and the loop c, so that the tension on the tie will serve to more tightly compress the arms a a on the bale and prevent them from being pulled out straight. The arms a a form a button to button into the loop c, and by being twisted to their outer extremities they are re-enforced in strength and offer a better resisting-surface to the bale.

The body a' of the splice may be twisted or not, as may be desired, and its outer end may hook into or be attached to the loop c' in any mode desired; but that end always furnishes the means for adjusting the tie to the size of the bale.

In the manufacture, as before stated, the ties B may be all of one length, while the short pieces or splices may be of any length and furnished in separate bundles or packages.

The short piece or splice a' may be used more than once, if desired, by unbuttoning it from the loop c. In such case the loop should be long enough so one arm, a, may be turned back into the loop, as shown by the dotted lines in Fig. 2, when the pressure of the bale will throw the arm up in the loop so it can be caught, so as to pull the button entirely out of the loop, so that the bale-tie may be used again, if desired.

Having thus described my invention, what I claim as new, and desire to secure by Letters Patent, is as follows, to wit:

In the wire bale-tie described, the doubled short twisted splice a', having one end terminate in the two oppositely-twisted arms a a, in combination with tie B, having the end loops, c and c', the said splice a' adapted to be lengthened or shortened by letting it out or taking it up through the loop c' of the tie B, and arranged to clasp the bale by buttoning the arms a a of the splice a' into the loop c of the tie B, so they will lie between the bale and said loop, in the manner and for the purpose set forth.

JAMES R. ASHLEY.

Witnesses:
THOS. H. HUTCHINS,
WM. J. HUTCHINS.